(12) United States Patent
Bennett et al.

(10) Patent No.: US 6,905,033 B2
(45) Date of Patent: Jun. 14, 2005

(54) DEVICE FOR STORING A PLURALITY OF CDS WITH SWING-OUT COMPARTMENT ELEMENTS

(75) Inventors: Jason Bennett, Hong Kong (CN); Tat-Chi Chow, Hong Kong (CN); Qing Wang, Dong Guan (CN)

(73) Assignee: Sunhing Millennium Ltd., Kowloon (HK)

( * ) Notice: Subject to any disclaimer, the term of this patent is extended or adjusted under 35 U.S.C. 154(b) by 35 days.

(21) Appl. No.: 10/410,144

(22) Filed: Apr. 10, 2003

(65) Prior Publication Data
US 2003/0213758 A1 Nov. 20, 2003

(30) Foreign Application Priority Data
Apr. 10, 2002 (DE) .................................... 202 05 543 U

(51) Int. Cl.[7] ............................................. A47G 29/00
(52) U.S. Cl. ......................................................... 211/40
(58) Field of Search ........................ 211/40, 41.1, 41.11, 211/41.12, 41.13

(56) References Cited

U.S. PATENT DOCUMENTS

| | | | | |
|---|---|---|---|---|
| 4,875,743 A | * | 10/1989 | Gelardi et al. ............. 312/9.42 |
| 5,232,275 A | * | 8/1993 | Yamazoe .................... 312/9.58 |
| 5,697,684 A | * | 12/1997 | Gyovai ....................... 312/9.42 |
| 6,644,482 B2 | * | 11/2003 | Ku ................................ 211/40 |

* cited by examiner

Primary Examiner—Peter M. Cuomo
Assistant Examiner—Sarah Purol
(74) Attorney, Agent, or Firm—Burns, Doane, Swecker & Mathis, L.L.P.

(57) ABSTRACT

A device for storing a plurality of CDs has a housing which is directed horizontally along its longitudinal axis and stand elements at its two end sides. To accommodate a respective CD, a plurality of compartment elements are disposed side by side, perpendicular to the longitudinal axis and mounted on the housing such that they can be swung out about an axis extending parallel to the longitudinal axis from a storage position inside the housing to a removal position outside the housing. Swinging the compartment elements in to the storage position produces a compact, space-saving storage device. When a compartment element is swung out to remove a CD, the CD which is held therein can easily be grasped by the user.

15 Claims, 6 Drawing Sheets

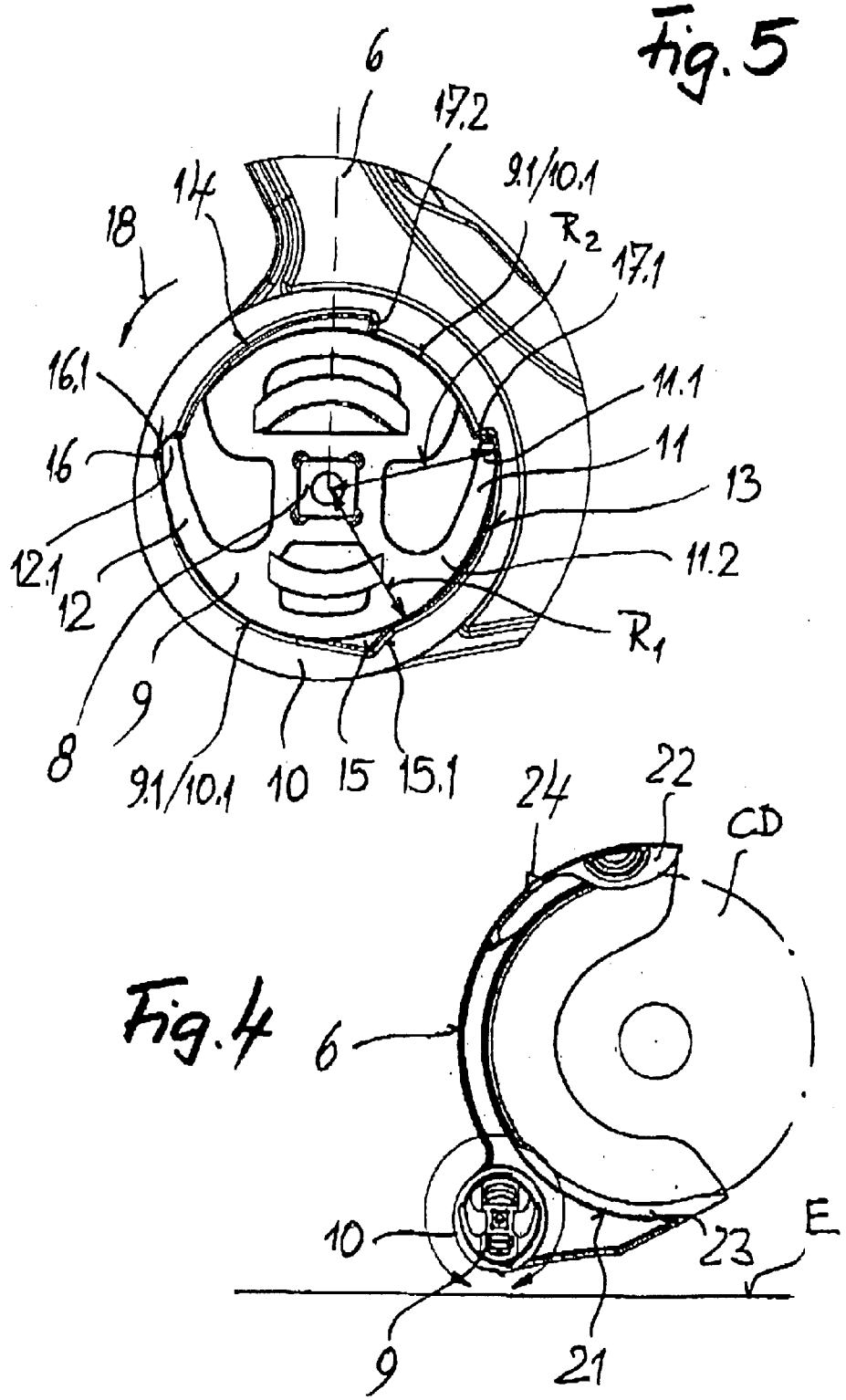

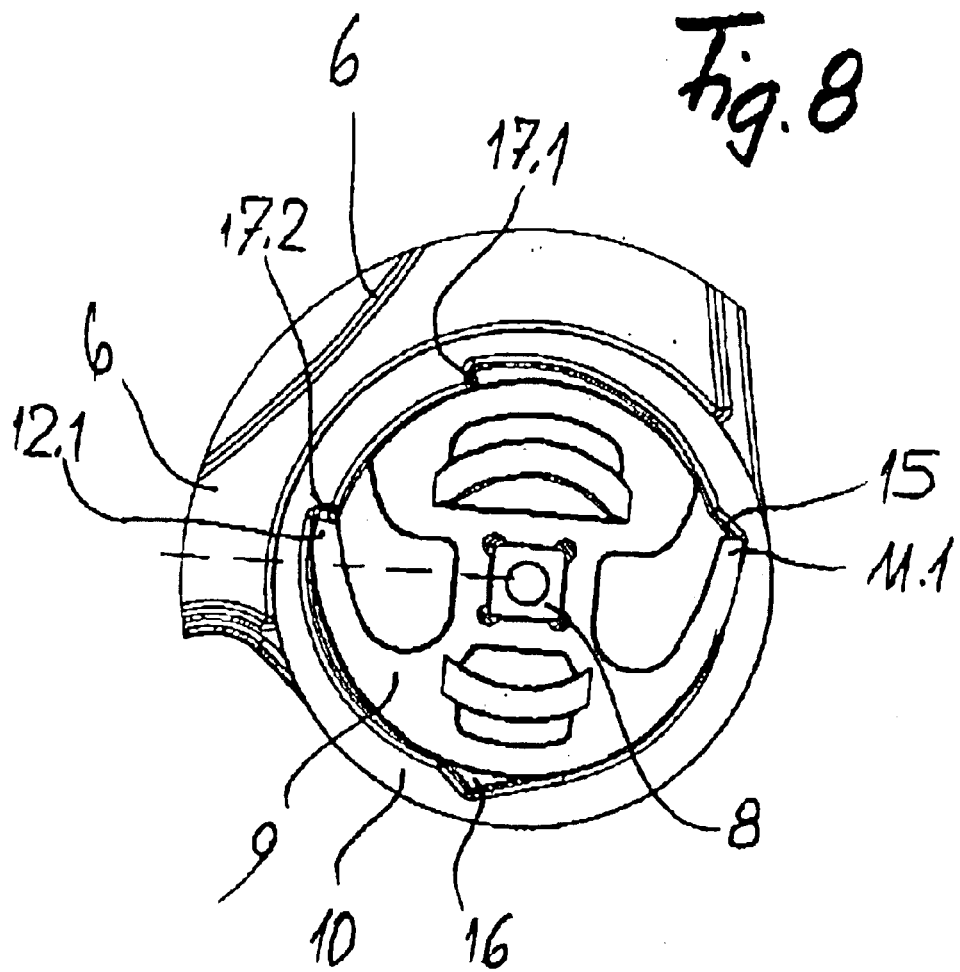
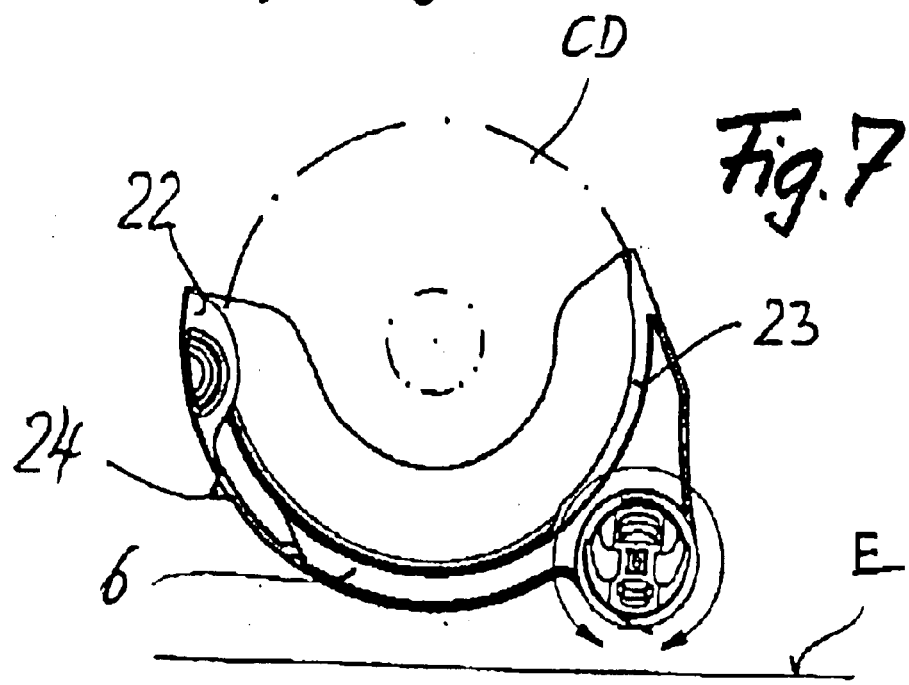

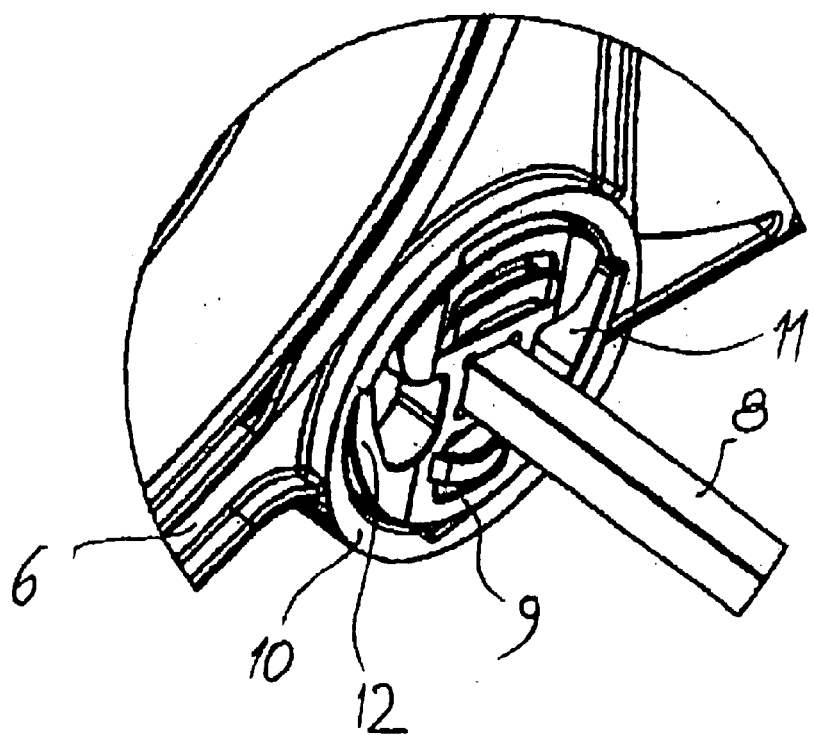

DEVICE FOR STORING A PLURALITY OF CDS WITH SWING-OUT COMPARTMENT ELEMENTS

It is often desirable, when storing compact discs with stored pieces of music, data or similar, to deposit the CDs in an easily accessible device on a table without the usual hinged protective case instead of in a storage device designed as a piece of furniture in column or cabinet form.

In order to solve this object, the invention proposes a device for storing a plurality of CDs with a housing which is directed horizontally along its longitudinal axis and comprises at least at its two end sides stand elements and, in order to accommodate a respective CD, a plurality of compartment elements which are disposed side by side, directed perpendicularly to the longitudinal axis and mounted at the housing such that they can be swung out about an axis extending parallel to the longitudinal axis from a storage position inside the housing into a removal position outside the housing. Swinging the compartment elements in to reach the storage position produces a compact, space-saving storage device. The compartment element concerned is then swung out to remove a CD, so that the CD which is held therein can easily be taken hold of by the user.

In an expedient configuration of the invention at least one stationary lock-in and brake spring element is associated with each compartment element, this being operative at least when the latter is swung out. The provision of a lock-in and brake spring element provides the possibility of holding the compartment elements in the storage position in each case by means of the spring acting as lock-in element and acting with a braking effect via the spring on the compartment element upon swinging the latter out, so that a certain resistance has to be overcome when swinging out: It may in this respect also be expedient to provide a second lock-in and brake spring element for each compartment element, this being directed opposite to the first lock-in and brake spring element and becoming operative when the associated compartment element is swung in. This guarantees that the compartment element is also fixed against pivoting in the removal position and a CD can thus be removed without the compartment element being pivoted during a possible tilting motion.

Further advantageous features and configurations of the invention are presented in the claims and illustrated in detail in the following description of schematic drawings of an embodiment. In the drawings:

FIG. 1 is a perspective view of a device for storing a plurality of CDs with compartment elements in the storage position, FIG. 2 shows the device according to FIG. 1 with the end plate removed and just one compartment element in the storage position, FIG. 3 is a representation according to FIG. 2 with the compartment element in the removal position, FIG. 4 is an end view onto a compartment element in the storage position, FIG. 5 is an enlarged representation of lock-in and brake spring elements at a compartment element in the storage position in a partial view, FIG. 6 is a perspective representation of the arrangement according to FIG. 5, FIG. 7 shows the arrangement according to FIG. 4 in the removal position, FIG. 8 is a representation according to FIG. 5 in the removal position, FIG. 9 is a perspective representation of the arrangement according to FIG. 8.

The embodiment, made of a plastics material, which is represented in FIG. 1 for a device for storing CDs consists essentially of a housing 1 which is directed horizontally along its longitudinal axis and comprises end walls 2 and 3 which are in each case provided with stand elements 4. The end walls 2 and 3 are firmly connected together at the back side of their housing by a wall shell 5. In the embodiment which is represented here the wall shell 5 is formed with a substantially cylindrical shape as a cylindrical half-shell. The front side of the housing 1 is closed by a plurality of compartment elements 6, which are disposed side by side and directed perpendicularly to the longitudinal axis, for accommodating a respective CD, these elements being mounted at the housing 1 such that they can be swung out about an axis 7 (FIG. 2) extending parallel to the longitudinal axis from a storage position (FIG. 2) inside the housing 1 into a removal position (FIG. 3) outside the housing 1. Just one compartment element 6 is represented in each case in FIGS. 2 and 3.

The pivot axis 7 is formed by a rod 8 with a polygonal cross section which is non-rotatably mounted at the two end walls 2 and 3 and made of metal, for example, onto which rod a respective bearing body 8 associated with a compartment element 6 is pushed so as to be non-rotatable. A respective compartment element 6 is pivotably mounted on a bearing body 9 via a moulded-on bearing ring 10, so that, as can be seen from a comparison of FIGS. 2 and 3, the compartment element 6 can be swung out of its storage position (FIG. 2) into its removal position (FIG. 3).

The wall shell 5 is provided at both faces with hook-shaped lugs 5.1, which are pushed into a corresponding undercut groove at the two end walls 2 and 3 and form a rigid lock-in connection between the wall shell 5 and the end walls 2 and 3.

The mounting of the compartment elements 6 is represented in an end view for the storage position of the associated compartment element 6 and also scaled-up. The bearing body 9 is pushed with its corresponding centre recess onto the rod 8 of square cross section. The bearing ring 10 at the compartment element 6 embraces the bearing body 9 at its outer circumference, with just sub-regions 9.1 of the bearing body 9 and corresponding sub-regions 10.1 of the bearing ring 10 being formed as cylindrical surfaces. E denotes the plane of the stands.

The bearing body 9 comprises two lock-in and brake spring elements 11 and 12, which are disposed so as to be axially symmetrical to one another, are formed as finger-shaped spiral springs and are flexible in the pivot plane of the compartment element 6. The free ends 11.1 and 12.1, respectively, of these spiral springs project beyond the cylindrical circumferential contour 9.1 of the bearing body 9.

The bearing ring 10 is provided on its side which is associated with the circumferential contour 9.1 in the range of action of the spiral springs 11 and 12 with a control contour 13 for the spiral spring 11 and a control contour 14 for the spiral spring 12. The control contours 13 and 14 are each designed such that a sunk lock-in point 15 and 16, respectively, is provided subsequent to the two cylindrical surfaces 10 and 10.

Related to the storage position which is represented in FIG. 5, the control contour 13 continues from the lock-in point 15 in the direction of the free end 11.1 of the spiral spring 11, starting from a radius $R_1$ corresponding to the radius of the cylindrical surface 10.1, in the direction of the free end 11.1 of the spiral spring 11 with an increasing centre distance up to the greater distance $R_2$, ending in a stop nose 17.1.

The outer contour of the spiral spring 11 is designed such that it also has a centre distance which increases from its base 11.2 at the bearing body up to the free end 11.1, The spiral spring 12 on the one hand and the associated control contour 14 on the other are shaped in the same way, which also ends in a support nose 17.2.

If the compartment element 6 is now swung in the direction of the arrow 18 out of the storage position which is represented in FIGS. 4 and 5 into the removal position which is shown in FIGS. 7 and 8, the frictional force which is exerted by the free end of the spiral spring 11 on the control contour 13 will increase with the pivotal movement, so that the pivoting operation can only be carried out with a certain expenditure of force. The free end 11.1 of the spiral spring 11 then lies in the lock-in point 15 in the end position which is represented in FIGS. 7 and 8.

The free end 12.1 of the spiral spring 12 must similarly overcome an inclined ramp 16.1 before the outer surface of the spiral spring 12 lies against the associated control contour 14 and, in the removal position which is shown in FIGS. 7 and 8, comes to lie against the stop nose 17 and reliably fixes the compartment element 6 in this position. The free end 11.1 of the spiral spring 11 then enters the lock-in recess 15, so that a return movement into the storage position is only possible by overcoming a corresponding counterforce, which is exerted by the ramp 15.1 on the free end 11.1 of the spiral spring 11.

FIG. 6 shows the position according to FIGS. 4 and 5 in a perspective representation. The same structural elements have been given the same reference characters, so that the preceding description can be referred to.

FIGS. 7, 8 and 9 show the compartment element 6 accordingly swung out in its removal position.

Figure 3:
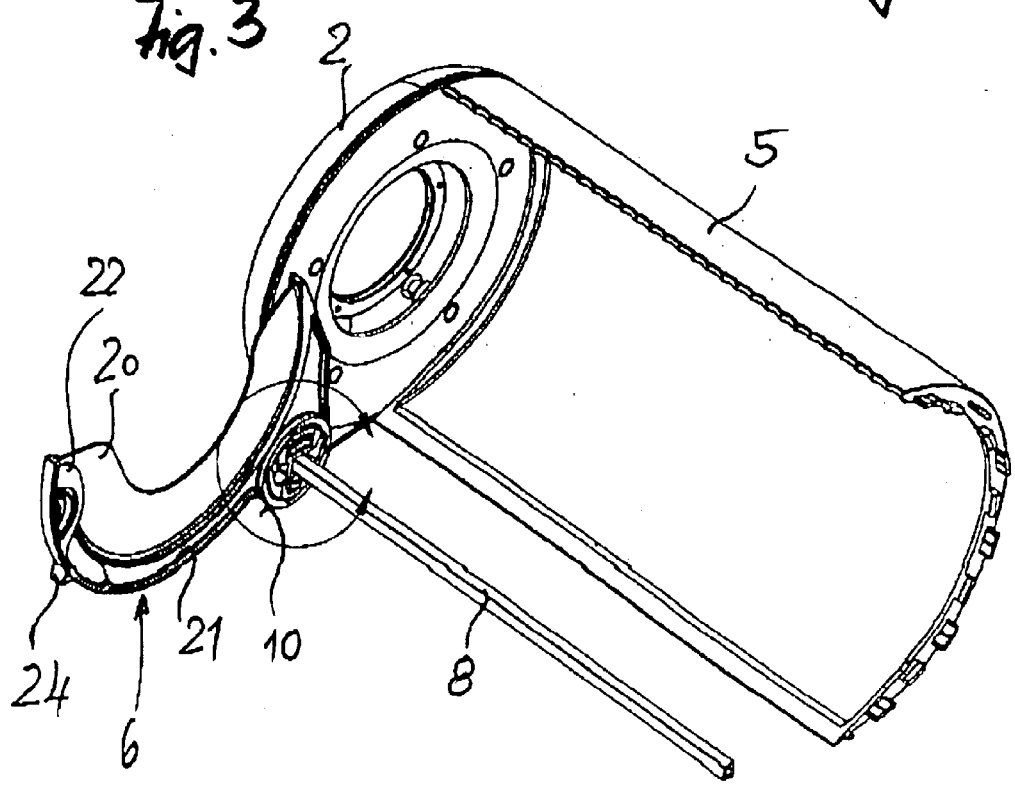
Figure 6:
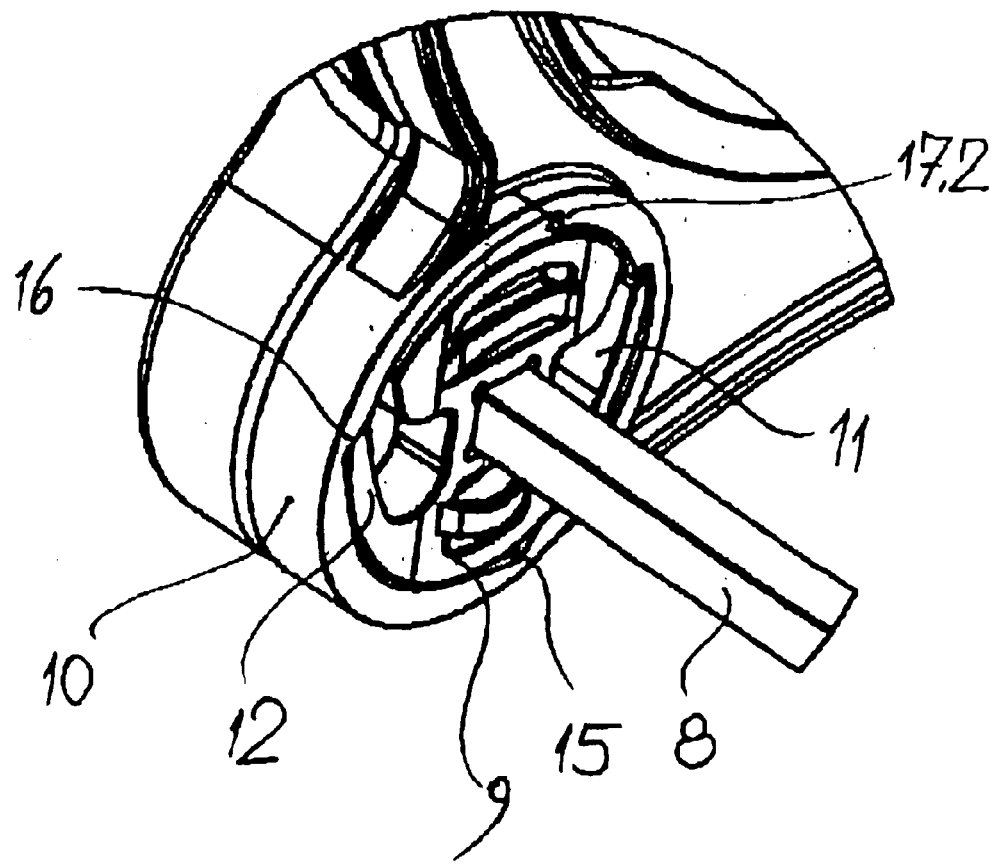

As can be seen in FIG. 3, the compartment elements 6 each comprise an approximately sickle-shaped side plate 20, which is provided at its outer circumference with a supporting web 21. The supporting web 21 is provided at its end which is remote from the bearing ring 10 with an inward directed gripping plate 22, which extends parallel to the side plate 20 at a distance therefrom. In the represented embodiment the supporting web 21 at the same time defines the outer contour of the compartment element 21. The supporting web 21 extends approximately in a semicircle and corresponds in terms of circumferential contour dimensions to the outer circumference of a CD to be inserted. The supporting web is channel-shaped at least in the region of the bearing ring 10, so that an inserted CD is reliably held at its edge by the channel-shaped part of the supporting web 21 on one side and the overlapping gripping plate 22 on the other. A CD can easily be inserted in the swung-out compartment element in the removal position which is represented in FIG. 3.

Figure 2:
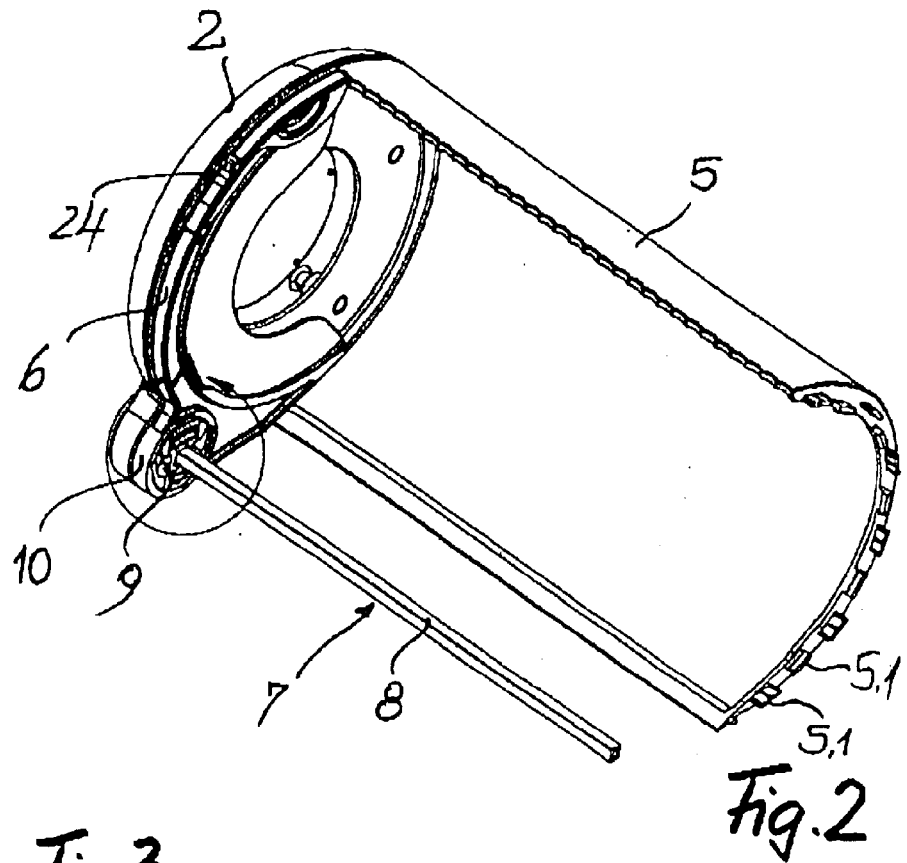

If the compartment element with inserted CD is pivoted into the storage position which is represented in FIGS. 2 and 4, then the inserted CD is reliably held in the compartment element, as represented by a dot-dash line in FIG. 4. As is evident in FIG. 4, the bearing ring 10 is in this case disposed at the compartment element 6 such that the lower, channel-shaped end region 23 of the supporting web 21 rises with respect to the plane E of the stands in the represented storage position.

Figure 1:
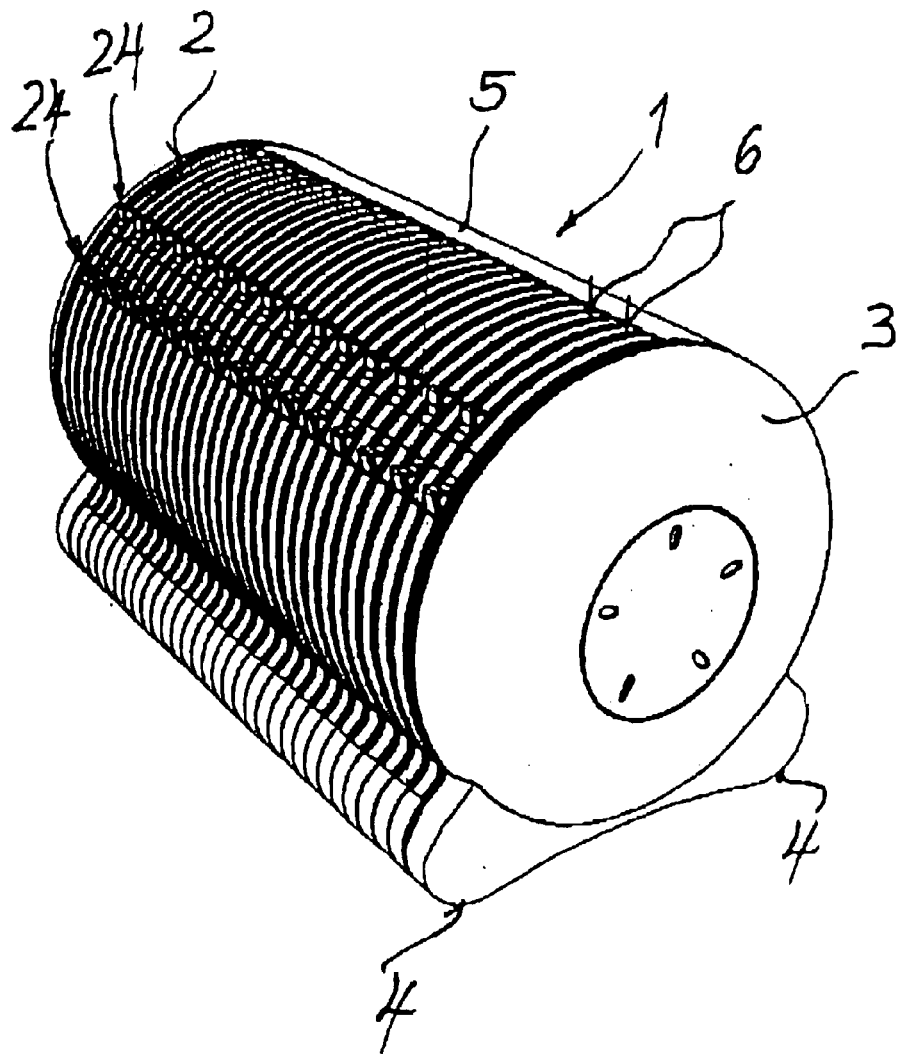

The individual compartment elements are each provided with a gripping nose 24. The arrangement is in this respect such that, viewed in the direction of the longitudinal axis, the gripping noses of the successive compartment elements 6 are staggered in alternating fashion in the circumferential direction, as shown in FIG. 1.

The invention is not restricted to the shape of the embodiments described above in the light of the drawings. The housing does not necessarily have to be formed with its back wall as a cylindrical half-shell. Other designs are also possible. Nor is it imperative for the outer contour of the compartment elements to be circular. A different outer contour is also conceivable here. Even if the outer contour of the compartment elements is polygonal, the inner trend of the supporting web must be formed as part of a circle. However the supporting web does not have to be continuous, but can instead be divided into supporting shoulders, for example at least two supporting shoulders. It is simply important for the inserted CD to be reliably held in the storage position which is represented in FIG. 4, without there being any possibility of it falling out of the compartment element either when the latter is pivoted into the storage position or back into the removal position.

What is claimed is:

1. Device for storing a plurality of CDs with a housing which is directed horizontally along its longitudinal axis and comprises stand elements at least at its two end sides and, in order to accommodate a respective CD, a plurality of compartment elements which are disposed side by side, directed perpendicularly to the longitudinal axis and mounted on the housing such that they can be swung out about a pivot axis extending parallel to the longitudinal axis from a storage position inside the housing into a removal position outside the housing, each compartment element having an associated stationary lock-in and brake spring element that is formed as a finger-shaped spiral spring which acts on a control contour connected to the compartment element, and that is operative at least when the compartment element is swung out.

2. Device according to claim 1, wherein each compartment element is mounted on a bearing body which is non-rotatably connected to the housing.

3. Device according to claim 2, further including a rod with a polygonal cross section that is non-rotatably disposed at the housing, onto which rod the individual bearing bodies are pushed and which defines the pivot axis for the compartment elements.

4. Device according to claim 2, wherein the compartment elements each comprise an approximately sickle-shaped side plate, which is provided with a bearing ring embracing the bearing body and provided at its outer circumference with at least one supporting element for the CD which is to be stored.

5. Device according to claim 4, further including an inward directed gripping plate, which extends parallel to the side plate at a distance therefrom, located at the supporting element at its end which is remote from the bearing ring.

6. Device according to claim 4, wherein the supporting element is disposed at the side plate of the compartment element approximately in a semicircle which corresponds in terms of its circumferential contour to the outer circumference of a CD.

7. Device according to claim 4, wherein the bearing ring is disposed at the compartment element such that the lower end region of the supporting element rises with respect to the plane of the stands into the interior space of the housing in the storage position.

8. Device according to claim 1, wherein the lock-in and brake spring element is disposed at the bearing body.

9. Device according to claim 1, wherein the control contour comprises a lock-in point at least for the swung-in storage position of the compartment element, which lock-in point must be overcome upon swinging out against the force of the lock-in and brake spring element.

10. Device according to claim 1, wherein the control contour comprises at one end a stop nose against which the free end of the lock-in and brake spring element comes to lie for support purposes in a respective end position.

11. Device according to claim 10, further including a second lock-in and brake spring element which is directed opposite to the first lock-in and brake spring element and becomes operative when the associated compartment element is swung in, and a corresponding second control contour with lock-in point and stop nose.

12. Device according to claim 1, wherein the housing is formed from two end plates, which are directed perpendicularly to the longitudinal axis, and a wall shell firmly connected to the end plates.

13. Device according to claim 12, wherein the wall shell is shaped as part of a circular cylinder, wherein an opening extending over the entire length of the housing remains free, and with their outer contour, the compartment elements complete the circular cylindrical shape of the wall shell in the storage position to form a substantially cylindrical shape.

14. Device according to claim 1, wherein each compartment element is provided with a gripping nose.

15. Device according to claim 14, wherein, when viewed in the direction of the longitudinal axis, the gripping noses of the compartment elements are staggered in alternating fashion in the circumferential direction.

\* \* \* \* \*